US008713536B2

(12) United States Patent
Everly et al.

(10) Patent No.: US 8,713,536 B2
(45) Date of Patent: Apr. 29, 2014

(54) METHOD AND SYSTEM FOR CONSTRUCTING A CUSTOMIZED WEB ANALYTICS APPLICATION

(75) Inventors: David Everly, Portland, OR (US); Eric Butler, Portland, OR (US)

(73) Assignee: WebTrends, Inc., Portland, OR (US)

( * ) Notice: Subject to any disclaimer, the term of this patent is extended or adjusted under 35 U.S.C. 154(b) by 1271 days.

(21) Appl. No.: 12/483,169

(22) Filed: Jun. 11, 2009

(65) Prior Publication Data

US 2010/0318976 A1   Dec. 16, 2010

(51) Int. Cl.
*G06F 9/44*   (2006.01)
(52) U.S. Cl.
USPC ........... 717/127; 717/113; 717/111; 717/126; 717/110; 717/109; 715/736; 709/224
(58) Field of Classification Search
None
See application file for complete search history.

(56) References Cited

U.S. PATENT DOCUMENTS

| | | | | |
|---|---|---|---|---|
| 7,992,135 | B1* | 8/2011 | Wong et al. | 717/126 |
| 8,171,415 | B2* | 5/2012 | Appleyard et al. | 715/747 |
| 2002/0065879 | A1* | 5/2002 | Ambrose et al. | 709/203 |
| 2003/0217332 | A1* | 11/2003 | Smith et al. | 715/513 |
| 2004/0205493 | A1* | 10/2004 | Simpson et al. | 715/501.1 |
| 2007/0011304 | A1* | 1/2007 | Error | 709/224 |
| 2007/0027864 | A1* | 2/2007 | Collins et al. | 707/5 |
| 2007/0061486 | A1* | 3/2007 | Trinh et al. | 709/246 |
| 2007/0150496 | A1* | 6/2007 | Feinsmith | 707/100 |
| 2007/0233511 | A1 | 10/2007 | Winters et al. | |
| 2008/0201643 | A1* | 8/2008 | Nagaitis et al. | 715/738 |
| 2009/0085934 | A1* | 4/2009 | Baier et al. | 345/660 |
| 2009/0100154 | A1* | 4/2009 | Stevenson et al. | 709/220 |
| 2009/0254971 | A1* | 10/2009 | Herz et al. | 726/1 |

OTHER PUBLICATIONS

Eirinaki et al. Web Mining for Web Personalization, Mar. 25, 2003.*
SCT Banner Web General User Guide, Jan. 2005, Sungard SCT Higher Education, Release 7.0.*

* cited by examiner

*Primary Examiner* — Lewis A Bullock, Jr.
*Assistant Examiner* — Tina Huynh
(74) *Attorney, Agent, or Firm* — Marger, Johnson & McCollom, P.C.

(57) ABSTRACT

A method for constructing a customized web analytics application comprises providing a base analytics code, including a base data mining code and a plurality of tokens corresponding to unincorporated code snippets, and incorporating code snippets as selected to create the application where each code snippet is configured to track a different custom web analytic. The system displays a selection of at least one web analytic to track and receives user selection of at least one displayed web analytic to track over a wide area network. Once selected, an unincorporated code snippet corresponding to each selected displayed web analytic is retrieved from a library of such code snippets. The code snippet is then substituted in place of its corresponding token within the base analytics code to create a customized analytics code. The customized code is finalized by removing the remaining tokens and the finalized code transmitted to the user for incorporation into their web pages.

18 Claims, 10 Drawing Sheets

METHOD AND SYSTEM FOR CONSTRUCTING A CUSTOMIZED WEB ANALYTICS APPLICATION

BACKGROUND OF THE INVENTION

The present application relates to web traffic analytics and more particularly to methods and systems for allowing one to customize the type of analytics tracked through a graphic user interface.

Programs for analyzing traffic on a network server, such as a worldwide web server, are known in the art. One such prior art program is described in U.S. Pat. No. 6,925,442 for a Method and Apparatus for Evaluating Visitors to a Web Server, which is co-owned with the present application and incorporated herein by reference for all purposes. In these prior art systems, the program typically runs on the web server that is being monitored. Data is compiled, and reports are generated on demand—or are delivered from time to time via email—to display information about web server activity, such as the most popular page by number of visits, peak hours of website activity, most popular entry page, etc.

Analyzing activity on a worldwide web server from a different location on a global computer network ("Internet") is also known in the art. To do so, a provider of remote web-site activity analysis ("service provider") generates JavaScript code that is distributed to each subscriber to the service. The subscriber copies the code into each web-site page that is to be monitored, or alternately sends the code to the visitor computer as an external include by embedding a GET command into the web page that then retrieves the additional tracking code from an external server.

When a visitor to the subscriber's web site loads one of the web-site pages into his or her computer, the JavaScript code collects information, including time of day, visitor domain, page visited, etc. The code then calls a server operated by the service provider—also located on the Internet—and transmits the collected information thereto as a URL parameter value. Information is also transmitted in a known manner via a cookie.

Each subscriber has a password to access a page on the service provider's server. This page includes a set of tables that summarize, in real time, activity on the customer's web site.

The above-described arrangement for monitoring web server activity by a service provider over the Internet is generally known in the art. Examples of the information analyzed includes technical data, such as most popular pages, referring URLs, total number of visitors, returning visitors, etc. The basic mechanism of such services is that each tracked web-site page contains some JavaScript in it that requests a 1×1 image from the service provider's server. Other information is sent along with that request, including a cookie that uniquely identifies the visitor. Upon receipt of the request, the service provider records the hit and stages it for full accounting. This is a proven method for tracking web site usage.

The type of information that can be tracked is nearly limitless. Every additional piece of information tracked necessarily increases the size of the code used to track this information. As a result, users wanting to track a huge amount of visitor information incur a large overhead on code downloaded with the web page or sent as an external include.

A problem arises when customizing the data mining code for different subscribers. That is, one subscriber may want to track many different aspects of a web site visitor's interaction with a web site, while another might just want the basics such as what browser the visitor is using and at what resolution the visitor has set their display device. Two conventional methods have been employed to service these different types of subscribers: (1) a service provider would provide a single piece of monolithic code to all subscribers that accounts for and reports every possible data to be tracked but ignores the unneeded data in the tracking process, or (2) a service provider provides a basic level of service that tracks the minimal data, and manually programs additional pieces as necessary to track the additional data specified by each individual subscriber. The first method has the disadvantage of requiring all subscribers to attach a large piece of code to their web pages, and also generating much data that will go unused. The second method, while more efficient for the subscriber, incurs additional overhead to the service provider by requiring each tracking program to be manually tailored to the customer.

Accordingly, the need still remains for simplifying the steps needed to custom tailor a web analytics program for the needs of different subscribers having different needs.

SUMMARY OF THE INVENTION

A method for constructing a customized web analytics application comprises providing a base analytics code, including a base data mining code and a plurality of tokens corresponding to unincorporated code snippets, and incorporating code snippets as selected to create the application where each code snippet is configured to track a different custom web analytic. The system displays a selection of at least one web analytic to track and receives user selection of at least one displayed web analytic to track over a wide area network. Once selected, an unincorporated code snippet corresponding to each selected displayed web analytic is retrieved from a library of such code snippets. The code snippet is then substituted in place of its corresponding token within the base analytics code to create a customized analytics code. The customized code is finalized by removing the remaining tokens and the finalized code transmitted to the user for incorporation into their web pages.

A system for configuring a customized analytics tag comprises a display device, for displaying a selection of at least one available analytics tracking option and an input device, for receiving user selection of at least one available analytics tracking option and for receiving input indicating a desired configuration for the selected at least one analytics tracking option. A module library stores a code snippet associated the at least one available analytics tracking option and an integration module incorporates the selected analytics tracking option into a BASE tag in place of a token placeholder to form a customized analytics tag. Finally, a delivery module delivers the customized analytics tag to the user for incorporation into the user's web pages to be tracked.

The foregoing and other objects, features and advantages of the invention will become more readily apparent from the following detailed description of a preferred embodiment of the invention that proceeds with reference to the accompanying drawings.

APPENDIX lists a preferred implementation of the BASE code operable with token placeholders to accommodate additional code modules that enhance the BASE code's analytics capability according to methods of the invention.

DETAILED DESCRIPTION

Figure 1:
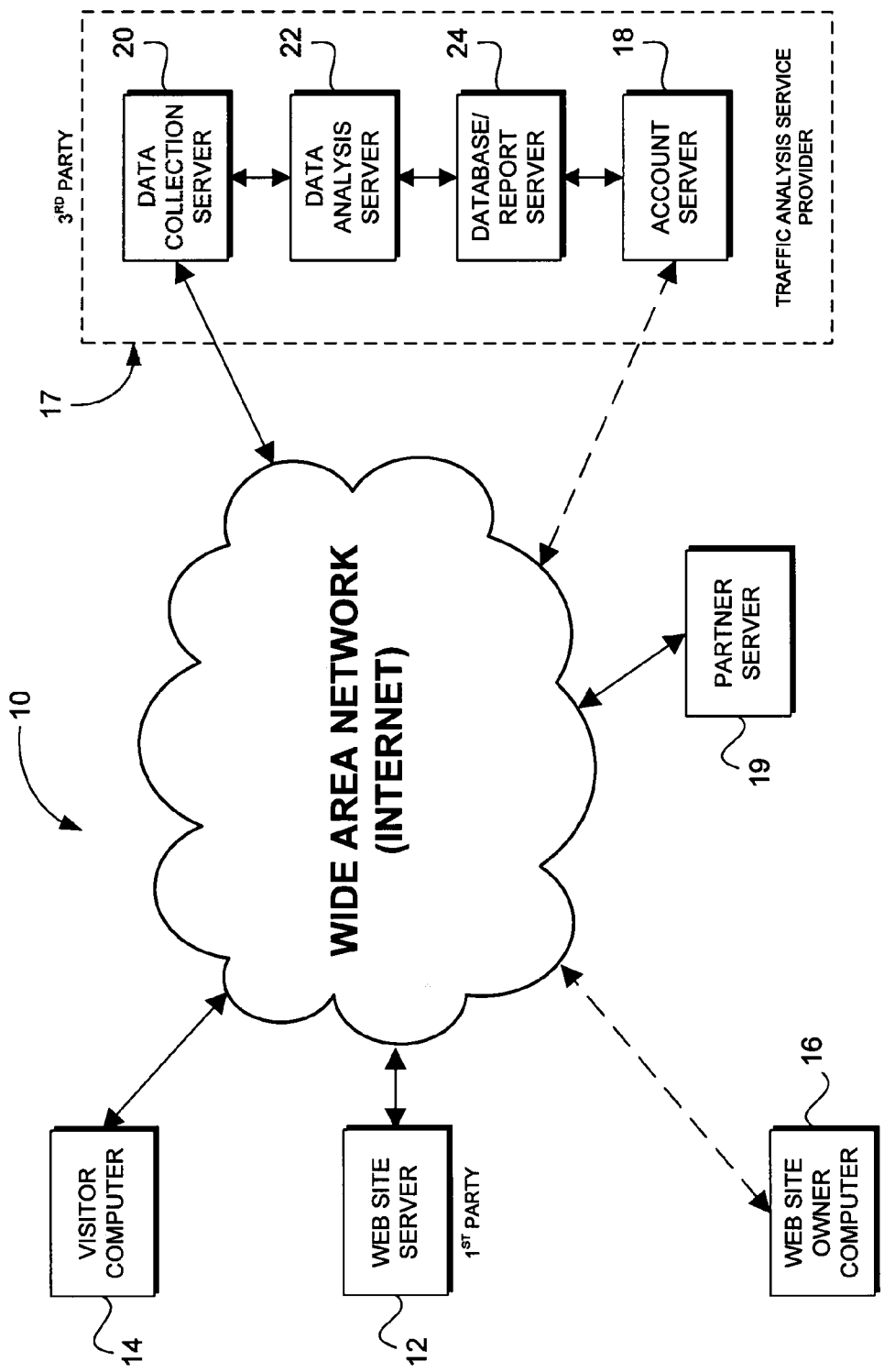
FIG. 1 is a schematic view of a portion of the Internet on which the invention is operated.

Turning now to FIG. 1, indicated generally at 10 is a highly schematic view of a portion of the Internet implementing the present invention. Included thereon is a worldwide web server 12. Server 12, in the present example, is operated by a web site operator or hosting service, such as a business that sells products or services via server 12. The server includes a plurality of pages that include various types of content such as news, multimedia plug-ins, business information, products for sale, etc. A site visitor can download to his or her computer such content to a computer, like computer 14, using a conventional browser program running on the computer.

As mentioned above, it would be advantageous to the content provider or seller to have an understanding about how visitors or potential customers and the like use server 12. As also mentioned above, it is known to obtain this understanding by analyzing web-server log files at the server that supports the content provider web site. It is also known in the art to collect data over the Internet and generate activity reports at a remote server.

When the owner of server 12 first decides to utilize a remote service provider to generate such reports, he or she uses a computer 16, which is equipped with a web browser, to visit a web server 18 operated by the service provider. On server 18, the subscriber opens an account and creates a format for real-time reporting of activity on server 12.

To generate such reporting, server 18 provides computer 16 with a small piece of code, typically JavaScript code (data mining code). Whereas the code provided in a typical operation is standardized for all subscribers as a BASE code, some subscribers may wish to customize this data mining code so that it tracks additional events, visitor actions, and include additional filtering options than that provided for in the BASE code. The customized data mining code may further include portions configured to retrieve certain data mining parameters and report such parameters in a format readable by partner servers 19. Accordingly, a single tag may be constructed that accommodates data mining analytics needs of not only the original service provider, but also other service providers (e.g. Quantcast) that partner with the original service provider. These customization processes are further described below and referred to herein as the "tag builder" process and apparatus.

In one aspect of the invention, the subscriber simply copies and pastes the entire code or tag onto each web page maintained on server 12 for which monitoring is desired. In an alternate embodiment, the subscriber is provided with two pieces of code: (i) an html portion of the code to be incorporated directly into the web page, and (ii) a JavaScript .js file that is later retrieved by the visitor computer using a call for the additional file via an "external include" function embedded within the html portion of the code that is incorporated into the web page.

When a visitor from computer 14 (client node) loads one of the web pages having the embedded code therein, the code passes predetermined information from computer 14 to a server 20—also operated by the service provider—via the Internet. This information can include, e.g., the page viewed, the time of the view, the length of stay on the page, the visitor's identification, etc. Server 20 in turn transmits this information to an analysis server 22, which is also maintained by the service provider. This server analyzes the raw data collected on server 20 and passes it to a database server 24 that the service provider also operates.

When a visitor from computer 14 (client node) loads one of the web pages having the embedded code therein, the code passes predetermined information from computer 14 to a server or group of third party servers 17—also operated by the service provider—via the Internet. Server 17 (and those operating within its architecture such as servers 20, 22, 24, and 18) is referred to as a "third party" server because it is owned by the traffic analysis company rather than the company that owns and/or operates the website on server 12. This information mined from computer 14 can include, e.g., the page viewed, the time of the view, the length of stay on the page, the visitor's identification, etc. Such information, together with compilations of such data to form most popular pages, referring URLs, total number of visitors, returning visitors is also referred to herein as "technical data." Server 20 in turn transmits this information to an analysis server 22, which is also maintained by the service provider. The server 20 then passes the analyzed information to a database server 24 that the third party service provider also operates.

The data mining code embedded within the web page script operates to gather data about the visitor's computer. Also included within the web page script, or within the external include JavaScript, is a request for a 1×1 pixel image whose source is server 20. The 1×1 pixel image is too small to be viewed on the visitor's computer screen and is simply a method for sending information to server 20, which logs for processing by server 22, all web traffic information.

The data mined from the visitor computer by the data mining code is attached as a code string to the end of the image request sent to the server 20. By setting the source of the image to a variable built by the script, an example of which is shown in Table 1, below:

TABLE 1

Image Request with Traffic Analytics Attached http://statse.webtrendslive.com/dcs93tcsg10000s5fdeh4asp0__7e2f/
dcs.gif?&dcsdat=1244699286314&dcssip=
www.webtrends.com&dcsuri=/solutions.aspx&dcsref=
http://www.webtrends.com/&WT.co_f=
216.64.169.240-3402132528.29999032&WT.vtid=
216.64.169.240-3402132528.29999032&WT.vtvs=
1244699249682&WT.tz=-7&WT.bh=22&WT.ul=
en-us&WT.cd=8&WT.sr=1280x1024&WT.jo=Yes&WT.ti=
Solutions:%20Solving%20Complex%20Business%20Challenges%20-
for%20More%20than%2015%20Years&WT.js=
Yes&WT.jv=1.3&WT.ct=lan&WT.hp=0&WT.bs=
1260x761&WT.fv=10.0&WT.slv=
Unknown&WT.tv=8.6.0&WT.dl=0&WT.ssl=0&WT.es=
www.webtrends.com/solutions.aspx&WT.cg__n=Solutions&WT.pi=
Solutions&WT.vt__f__tlh=1244699249

By using the data transmission method illustrated above, all the gathered information can be passed to the web server doing the logging. In this case, for instance, the variable script "WT.co_f=216.64.169.240-3402132528.29999032" is sent to a service provider URL (e.g. webtrendslive.com) and is interpreted by a decoder program built into the data analysis server 22 to connote that a user with ID#216.64.169.240-3402132528.29999032, the variable script dcsuri=/solutions.aspx connotes that a user visited the page/solutions.aspx, and the variable script dcsref=http://www.webtrends.com connotes that a user came from page http://www.webtrends.com.

Another method for tracking visitors to a web site is through the use of objects called "cookies." A cookie is a piece of text that a web server can store on a user's hard disk. Cookies allow a web site to store information on a user's machine and later retrieve it. The pieces of information are stored as "name-value pairs" comprised of, for instance, a variable name (e.g. UserID) and a value (e.g. A9A3BECE0563982D) associated with that variable name.

Taking the web browser Microsoft Internet Explorer as an example, cookies are typically stored on a machine running Windows XP in a directory called C:\Documents and Settings\username\Cookies. The directory may list a vast number of name-value pairs, each associated with a particular domain from which they originated, representing all of the web sites that has placed a cookie on that particular computer. An example of a cookie file is shown below:

BIGipServerwww.webtrends.com_http
4047584266.20480.0000 www.webtrends.com/

The cookie above is typical of the type stored on a visitor's computer (hereinafter the client node) when visiting the web site located at the domain webtrends.com. The name of the name-value pair is BIGipServerwww.webtrends.com_http, and the value is 4047584266.20480.0000. Both the name and value of the pair are generated according to an algorithm programmed in the cookie server associated with the domain web site. The first time the client node browses the webtrends.com web site, software on that web site assigns a unique ID number for each visitor and instructs the browser on the client node to store the name-value pair as a cookie in a designated folder where it can be retrieved later. The same name-value pair data is stored on the webtrends.com cookie server (such as customer server 12) along with other information so that the visitor can be identified later.

Cookies operate according to an industry standard called "RFC2109" (request for comment).

A more complicated example of a cookie is shown below in reference to the eCommerce web site amazon.com. Visits to the amazon.com web site result in the storage of a more comprehensive set of information on the client node visiting the web site. The resulting cookie from such a visit is comprised of the following "crumbs":

Session-id-time 954242000 amazon.com/
Session-id 002-4135256-7625846 amazon.com/
x-main eKQIfwnxuF7qtmX52x6VWAXh@ih6Uo5H amazon.com/
ubid-main 077-9263437-9645324 amazon.com/

Each of these portions of the cookie, or "crumbs", is associated with the amazon.com domain. Based on these crumbs, it appears that amazon.com stores a main user ID, an ID for each session, and the time the session started on the visitor computer (as well as an x-main value, which could be anything). While the vast majority of sites store just one piece of information—a user ID—on a visitor computer, there is really no limit to the amount of information such sites can store on the visitor computer in name-value pairs.

A name-value pair is simply a named piece of data. It is not a program, and it cannot "do" anything. A web site can retrieve only the information that it has placed on the client node computer. It cannot retrieve information from other cookie files, or any other information from your machine.

The data moves in the following manner. If one were to type the URL of a web site into a computer browser, the browser sends a request to the web site for the page. For example, if one were to type the URL http://www.amazon.com into the browser, the browser will contact Amazon's server and request its home page. When the browser does this, it will look on the requesting machine for a cookie file that Amazon has set. If it finds an Amazon cookie file, the browser will send all of the name-value pairs in the file to Amazon's server along with the URL. If it finds no cookie file, it will send no cookie data. Amazon's web server receives the cookie data and the request for a page. If name-value pairs are received, Amazon can use them.

If no name-value pairs are received, Amazon knows that the visitor operating that computer has not visited before. The server creates a new ID for that visitor in Amazon's database and then sends name-value pairs to the computer in the header for the web page it sends. The computer stores the name-value pairs on its hard disk drive according to the Cookie RFC protocol.

The web server can change name-value pairs or add new pairs whenever you visit the site and request a page.

There are other pieces of information that the server can send with the name-value pair. One of these is an expiration date. Another is a path so that the site can associate different cookie values with different parts of the site.

Cookies evolved because they solve a big problem for the people who implement web sites. In the broadest sense, a cookie allows a site to store state information on a visitor's computer. This information lets a web site remember what state the browser is in. An ID is one simple piece of state information—if an ID exists on the visiting computer, the site knows that the user has visited before. The state is, "Your browser has visited the site at least one time," and the site knows the user ID from that visit.

Web sites conventionally use cookies in many different ways. For instance, sites can accurately determine how many readers actually visit the site, which are new as opposed to repeat visitors, and how often each visitor has visited the site. It turns out that because of proxy servers, caching, concentrators and so on, the only way for a site to accurately count visitors is to set a cookie with a unique ID for each visitor. The way the site does this is by using a database. The first time a visitor arrives, the site creates a new ID in the database and sends the ID as a cookie. The next time the user comes back, the site can increment a counter associated with that ID in the database and know how many times that visitor returns.

Sites can also store user preferences so that the site can look different for each visitor (often referred to as customization). For example, if one were to visit msn.com, it offers the visitor the ability to change content/layout/color. It also allows one to enter a zip code and get customized weather information. When the zip code is entered, the following name-value pair is an example of what might be added to MSN's cookie file:
WEATCC.NC%5FRaleigh%2DDurham®ION=www.msn.com/
It is apparent from this name-value pair that the visitor is from Raleigh, N.C. Most sites seem to store preferences like this in the site's database and store nothing but an ID as a cookie, but storing the actual values in name-value pairs is another way to do it.

ECommerce Sites can implement things like shopping carts and "quick checkout" options. The cookie contains an ID and lets the site keep track of a visitor as the visitor adds different things to his or her "shopping cart." Each item added is stored in the site's database along with the visitor's ID value. When the visitor checks out, the site knows what is in his or her cart by retrieving all of the selections from the database associated with that user or session ID. It would be impossible to implement a convenient shopping mechanism without cookies or something like it.

In all of these examples, note that what the database is able to store is things the visitor has selected from the site, pages viewed from the site, information given to the site in online forms, etc. All of the information is stored in the site's database, and a cookie containing the visitor's unique ID is all that is stored on the client node 14 (FIG. 1) in most cases. Both the image request method, and the cookie method, result in each and every web-page visit and all information about that visit being reported—a result that can overwhelm the data collection server 20.

Figure 2:
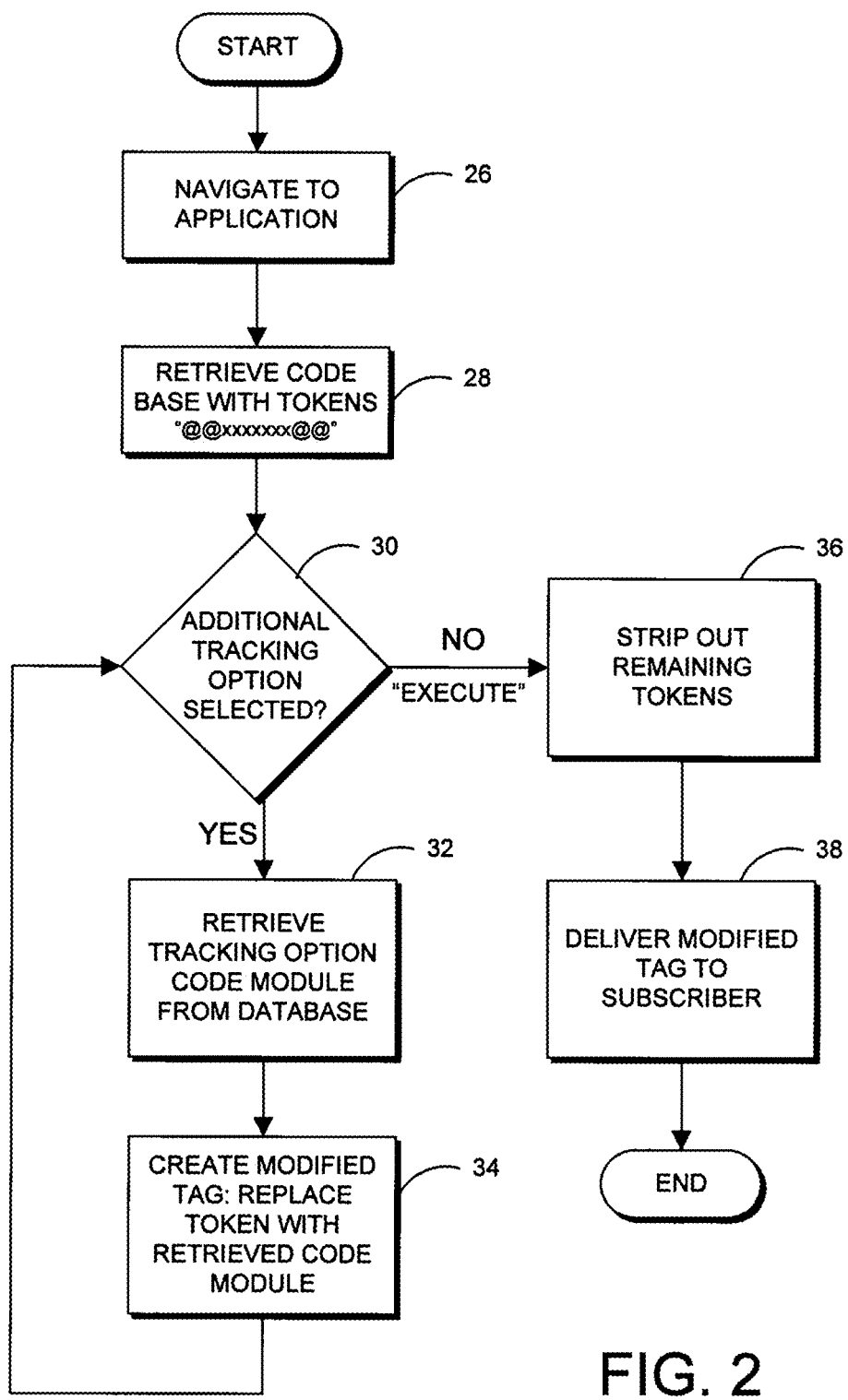
FIG. 2 is a flow diagram illustrating a method for constructing a customized analytics application according to a preferred embodiment of the invention.
Figure 5:
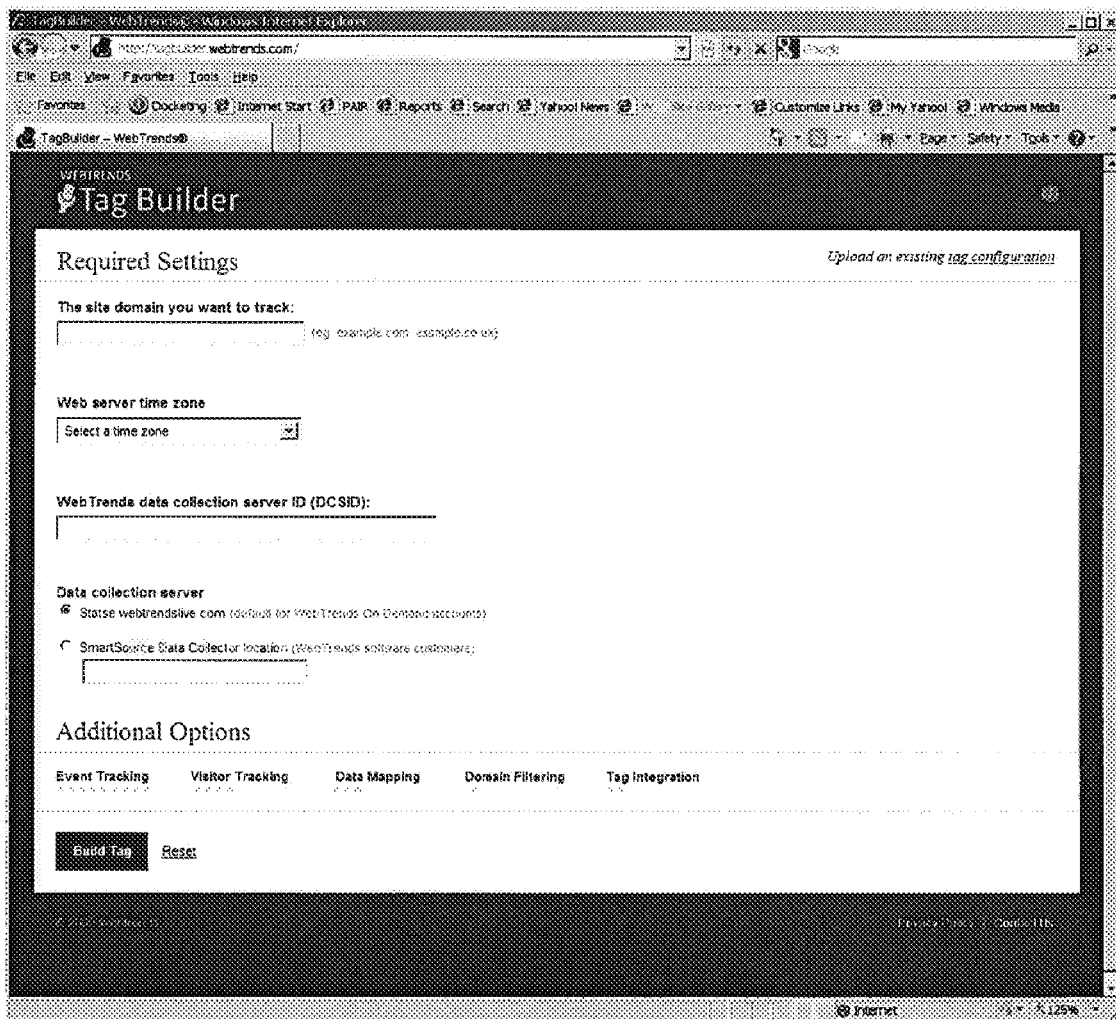
FIGS. 5-10 depict screen shots for a web traffic analytics customization program configured to accept subscriber entry of data and selection of options for which a customized web tracking tag is constructed according to methods of the invention such as shown in FIG. 2.

FIG. 2 illustrates a flow chart showing a preferred method for constructing the web analytics tag using a web 2.0 application or the like. In block 26, a subscriber to the service would navigate over the Internet to an application hosted on web server 18 using the subscriber's web-enabled computer 16. The application would operate in browser of computer 16 to present a graphic user interface whereby a subscriber to the tracking service would select web analytics tracking options to incorporate into the tracking tag. In the example shown by the graphic user interface of FIG. 5, the subscriber would navigate to the URL https://tagbuilder.webtrends.com/ using their computer 16. Although it is contemplated that a subscriber could operate a local program at their computer 16 to construct the web analytics tag as described, it will be appreciated that constructing the tag from a central location has the advantage of needing only a single update from the service provider to add additional options and/or modify the code as needed.

In a preferred implementation, the Tag Builder application is a web based application (https://tagbuilder.webtrends.com). The application can operate in MS Internet Information Services 6.0 and be developed using ASP.NET 2.0, C#, ASP .NET Ajax Control Toolkit, and JavaScript. A subscriber would first enter customer-specific information and select from various options. The subscriber would then click the Build Tag button and a ZIP archive file containing the JavaScript/HTML/XML is downloaded to their computer. The subscriber can also upload XML file to restore field settings in effect when tag was created.

A tag builder application operates on account server 18. Selection of options presented and entry of information within fields presented over the Internet by the tag builder application to the browser of computer 16 dictates the final tag generated and presented to the subscriber. In block 28, navigation of the subscriber to the tag builder application causes the application to start with a code base (termed BASE code) that provides only minimal functionality and a small subset of possible web analytics tracking features. An example of the BASE code is listed in the APPENDIX. The BASE code includes subroutines configured to operate within a browser environment to capture visitor behavior and settings while browsing to certain web pages and the like.

The BASE code further includes placeholders, called "tokens" that are identified by @@ identifiers. Examples of tokens within the BASE code listed in the APPENDIX include @@ONSITEDOMAINS@@, @@DOWNLOADTYPES@@, @@NAVIGATIONTAG@@, @@CUSTOMERFPC@@, @@ADCLICKPARAM@@, @@METANAMES@@, and @@TRACKEVENTS@@. Each token corresponds to a tracking option that can be selected by the subscriber through operation of the tag builder application. Each token is further associated with a subroutine or "code snippet" that acts to perform a certain tracking function when installed within the BASE code.

In operation, and as discussed further below, each token is located in a position within the BASE code that does not interfere with its operation. When an option is selected by the subscriber, as in query block 30 of FIG. 2, the code module or snippet is retrieved in block 32 from a database of such modules and installed within the BASE code in block 34 in place of the corresponding token. This step of introducing the module to the BASE code creates a modified tag. Control then passes back to query block 30 in which additionally selected options also trigger a retrieve and replace step as above.

Figure 7:
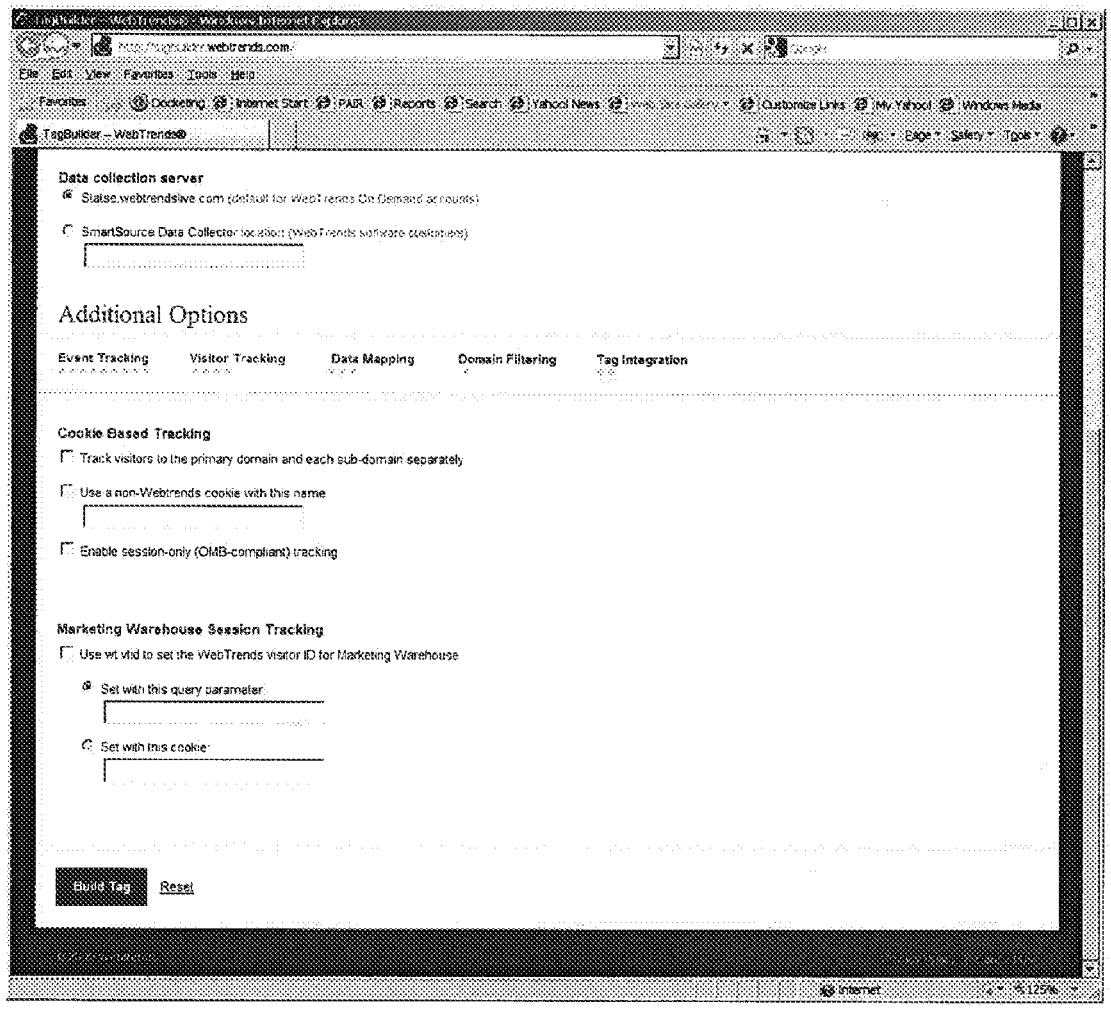

Once a subscriber has completed selection of options, as by clicking on an "execute" button or the like (e.g. the BUILD TAG button in FIG. 7), the tag builder program finalizes the tag by stripping out the remaining tokens in block 36—e.g. those corresponding to options or functions that were not selected by the subscriber—and the customized tag is delivered to the subscriber in block 38 as over the Internet via an html file or html and .js (internal exclude) file.

Figure 3:
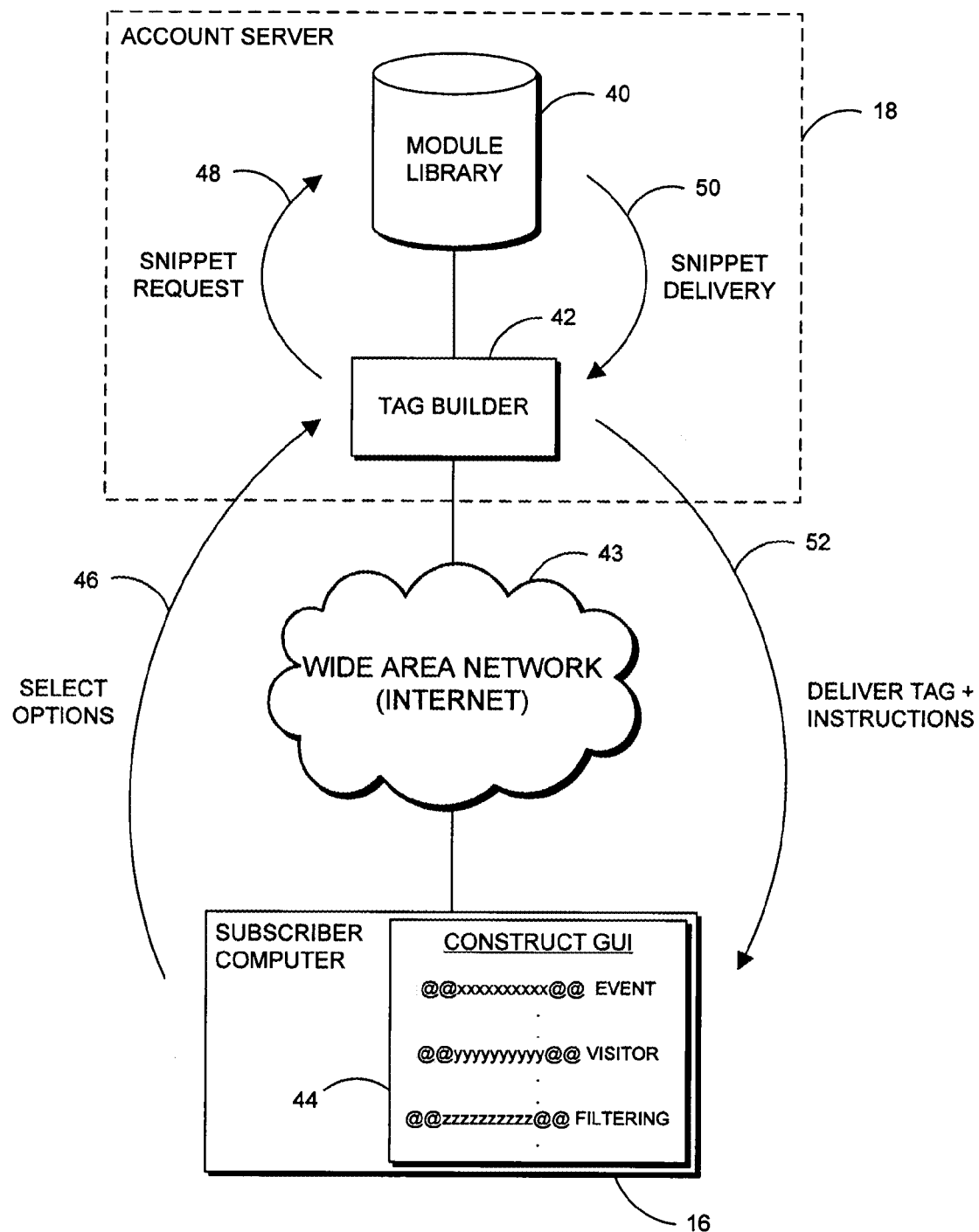
FIG. 3 is a schematic diagram illustrating the system used for implementing the method of FIG. 2.
Figure 6:
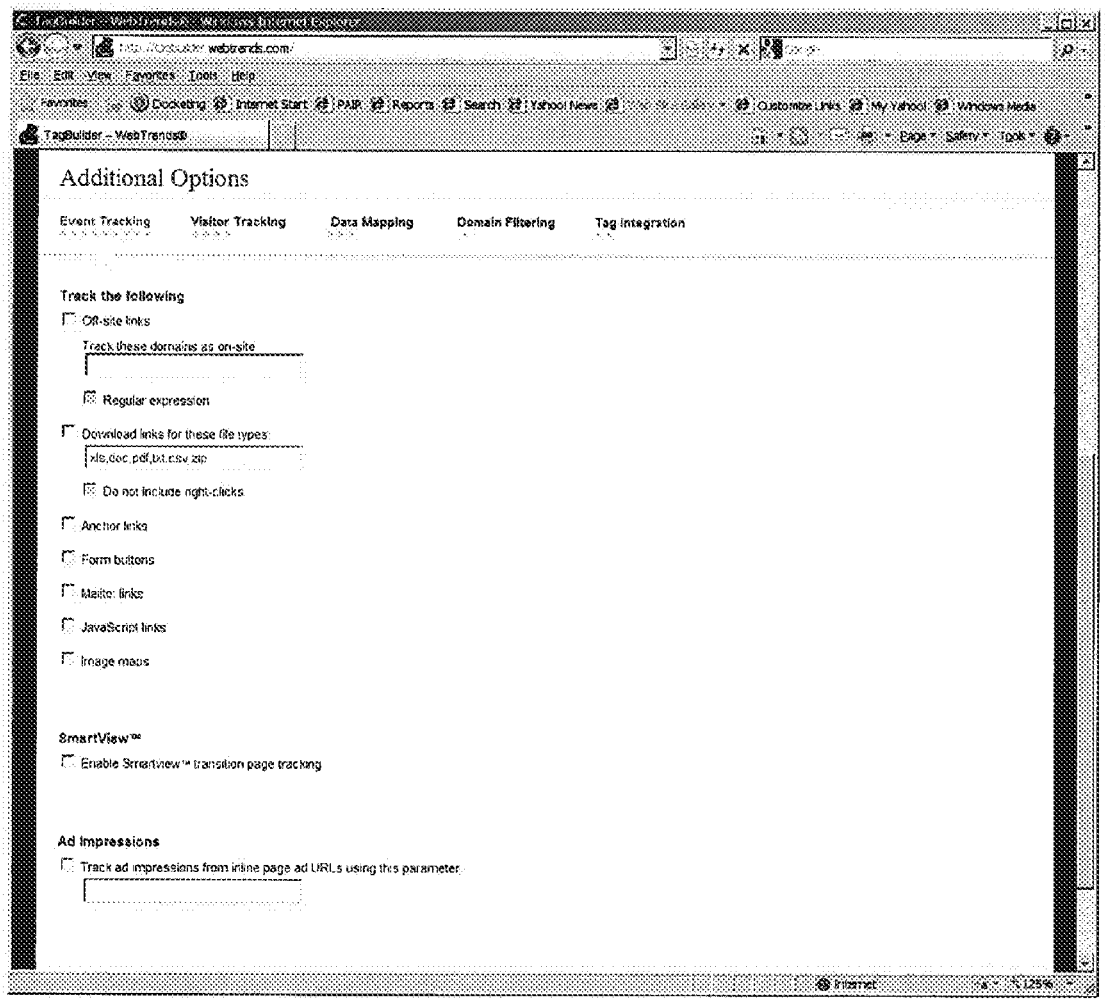
Figure 8:
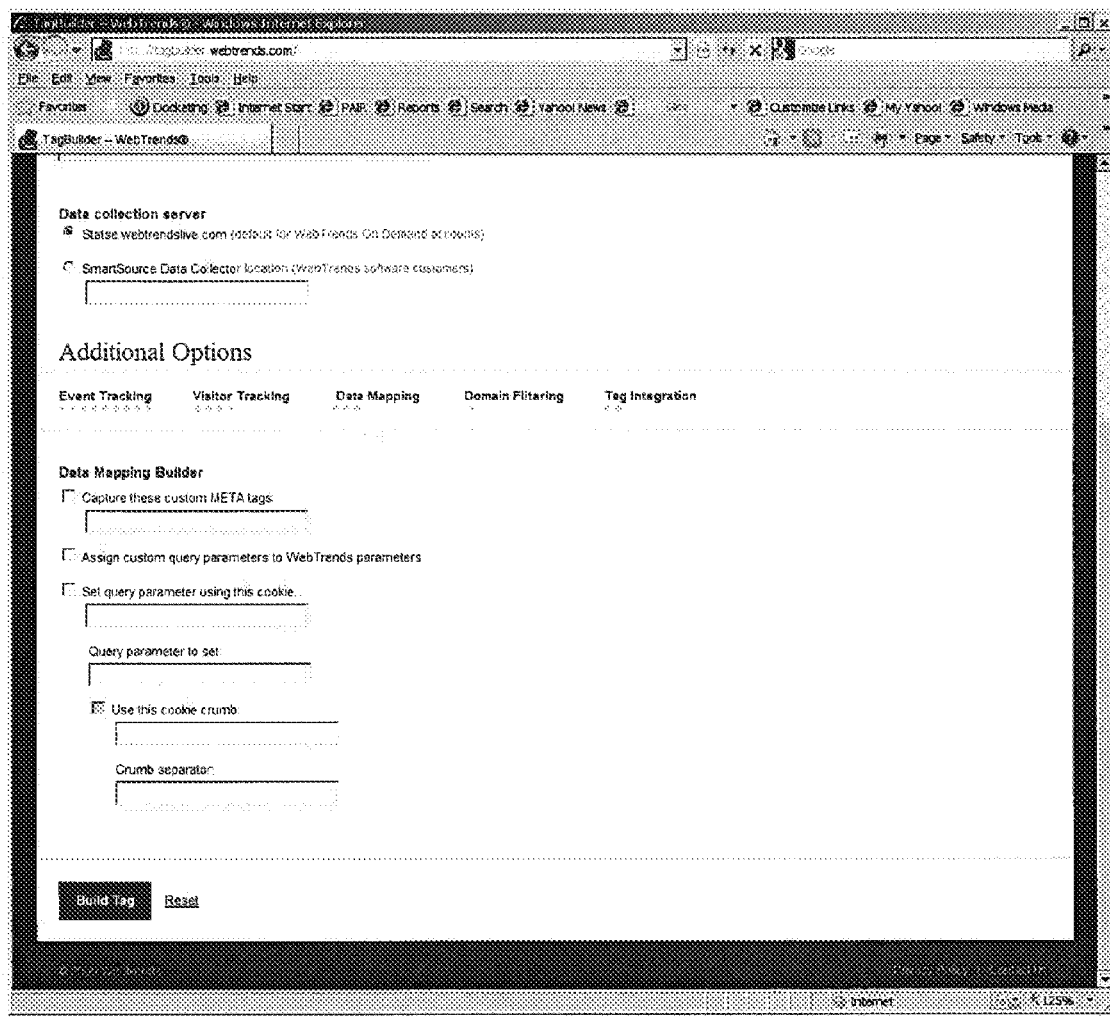
Figure 9:
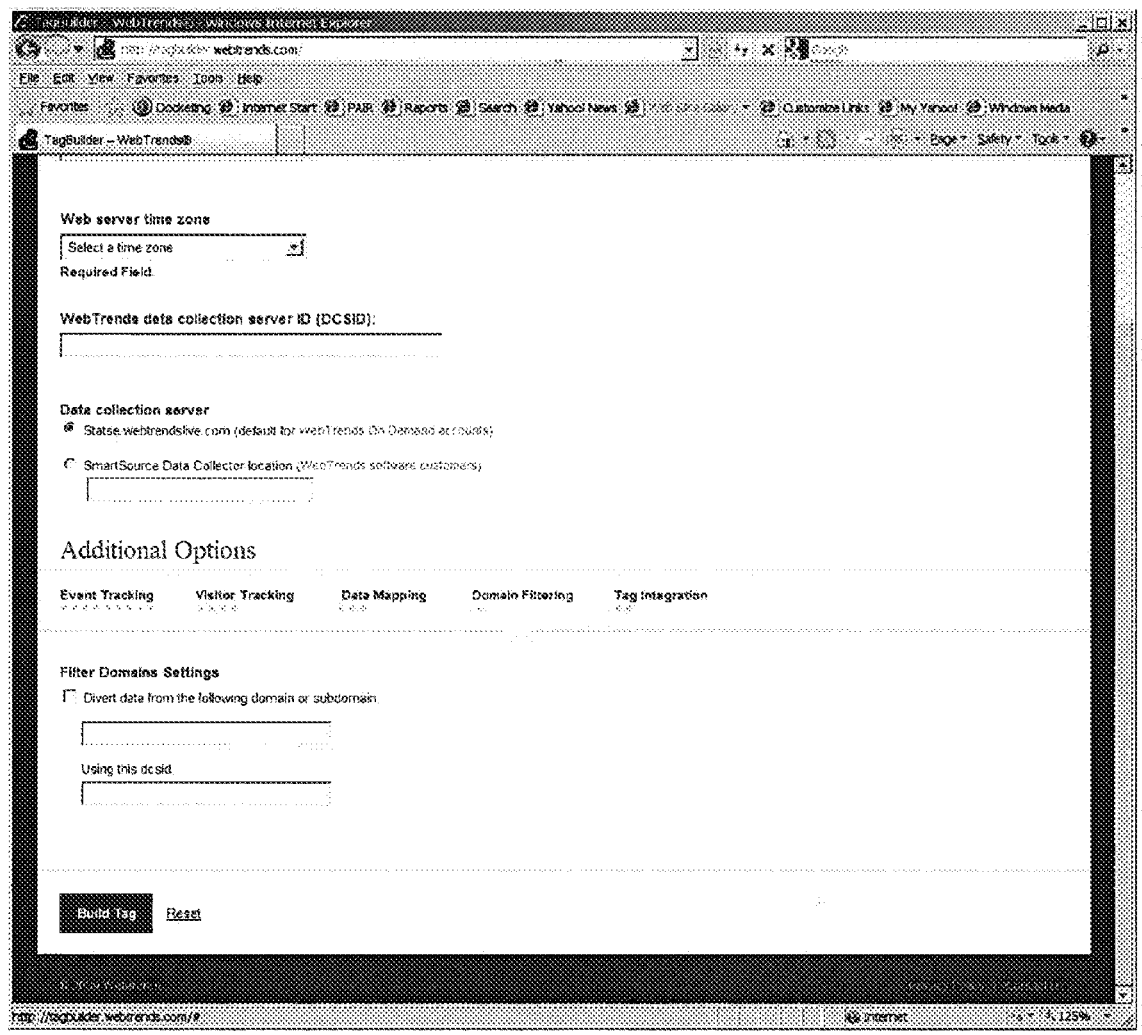
Figure 10:
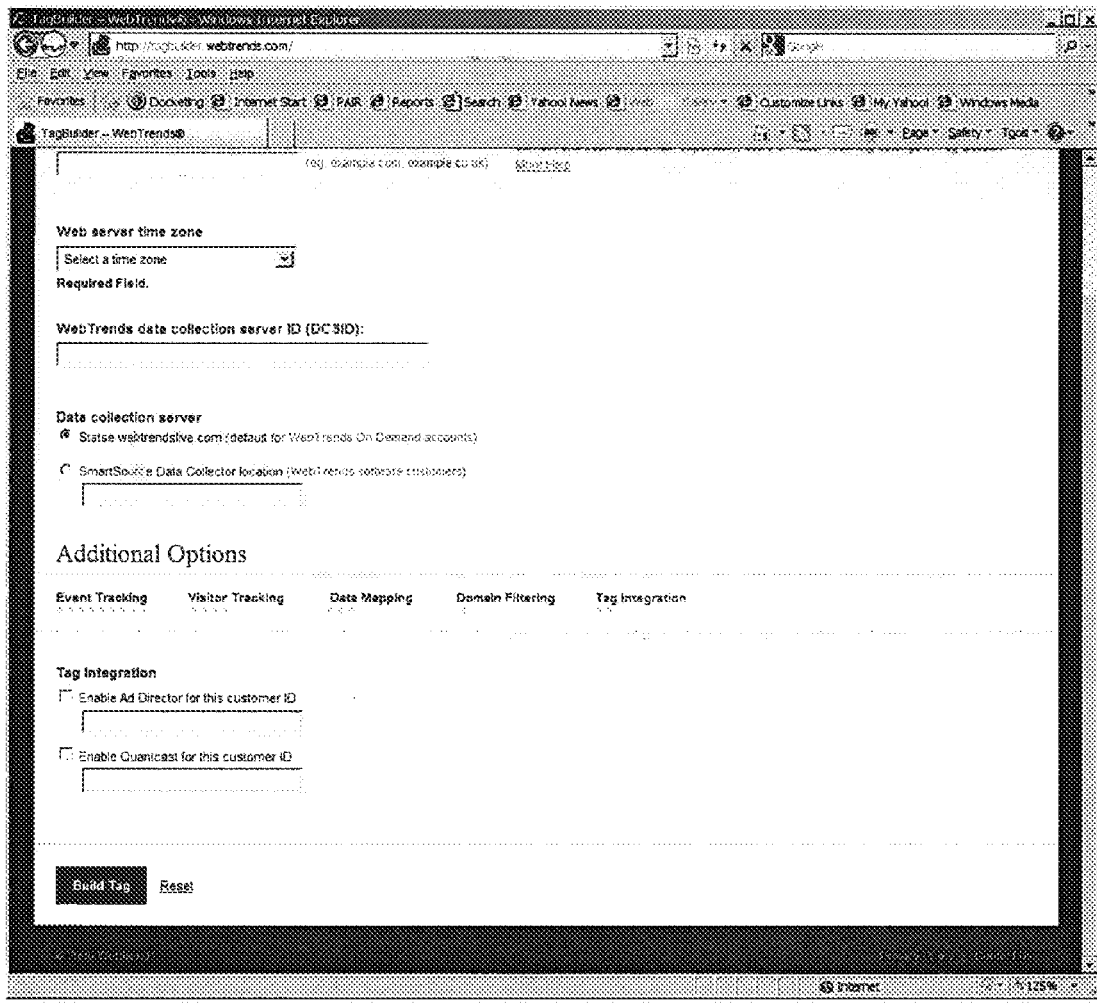

FIG. 3 shows a block schematic of the system used to construct and deliver the customized tag. The code modules or snippets for each token is stored in a module library 40 within account server 18. The tag builder web-based application 42 is operatively coupled to the module library 40 and makes retrieval calls to the library for delivery of specific code to the tag builder application. The subscriber computer 16 navigates to the web-based tag builder application via a wide area network such as the Internet 43. The tag builder application 42 then constructs a graphic user interface 44 through a browser operating on the subscriber computer 16. Upon selecting options—such as EVENT (FIG. 6), VISITOR (FIG. 7), DATA MAPPING (FIG. 8), FILTERING (FIG. 9), or TAG INTEGRATION (FIG. 10) options—the browser of subscriber computer communicates these selections via path 46 to the tag builder application 42. The snippets, or code modules corresponding to the selected options, are requested from module library along path 48 and the modules are delivered back to the tag builder application along path 50. The tag is then constructed as noted above—that is, by replacing corresponding tokens within the BASE code with the delivered code modules and removing the remaining (e.g. unsubstituted) tokens—and delivered back to the subscriber computer 16 along path 52. Instructions may also be delivered that inform the subscriber of how to incorporate the delivered tag into the web pages or resources to be tracked.

Examples of code snippets that can be substituted in place of associated Tokens into the BASE Tag 54 as shown in APPENDIX are in Tables 2 and 3:

TABLE 2

Download Snippet

```
// Code section for Track clicks to download links.
WebTrends.prototype.dcsDownload=function(evt){
    evt=evt||(window.event||"");
    if (evt&&((typeof(evt.which)!="number")||(evt.which==1))){
        var e=this.dcsEvt(evt,"A");
```

TABLE 2-continued

Download Snippet

```
if (e.href){
    var hn=e.hostname?(e.hostname.split(":")[0]):"";
    if
(this.dcsIsOnsite(hn)&&this.dcsTypeMatch(e.pathname,
this.downloadtypes)){
        var
qry=e.search?e.search.substring(e.search.indexOf("?")+1,
e.search.length):"";
        var
pth=e.pathname?((e.pathname.indexOf("/")!=0)?"/":"+
e.pathname:e.pathname):"/";
            var ttl="";
            var text=document.all?e.innerText:e.text;
            var img=this.dcsEvt(evt,"IMG");
            if (img.alt){
                ttl=img.alt;
            }
            else if (text){
                ttl=text;
            }
            else if (e.innerHTML){
                ttl=e.innerHTML;
            }
this.dcsMultiTrack("DCS.dcssip",hn,"DCS.dcsuri",pth,"DCS.dcsqry",
e.search||"","WT.ti","Download:"+ttl,"WT.dl","20",
"WT.nv",this.dcsNavigation(evt));
this.DCS.dcssip=this.DCS.dcsuri=this.DCS.dcsqry=this.WT.ti=
this.WT.dl=this.WT.nv="";
        }
    }
  }
}
```

TABLE 3

AdSearch Snippet

```
// Code section for Generate an Ad View query parameter for
every Ad Click link.
WebTrends.prototype.dcsAdSearch=function( ){
    if (document.links){
        var param=this.adclickparam+"=";
        var paramlen=param.length;
        var paramre=new RegExp(param,"i");
        var len=document.links.length;
        var pos=end=-1;
        var anch=urlp=value="";
        var urlpre;
        var url=document.URL+"";
        var start=url.search(paramre);
        if (start!=-1){
            end=url.indexOf("&",start);
            urlp=url.substring(start,(end!=-1)?end:url.length);
            urlpre=new RegExp(urlp+"(&|#)","i");
        }
        for (var i=0;i<len;i++){
            if (document.links[i].href){
                anch=document.links[i].href+"";
                if (urlp.length>0){
                    anch=anch.replace(urlpre,"$1");
                }
                pos=anch.search(paramre);
                if (pos!=-1){
                    start=pos+paramlen;
                    end=anch.indexOf("&",start);
                    value=anch.substring(start,(end!=-
1)?end:anch.length);
                    this.WT.ad=this.WT.ad?(this.WT.ad+";"+value):value;
                }
            }
        }
    }
}
```

Figure 4:
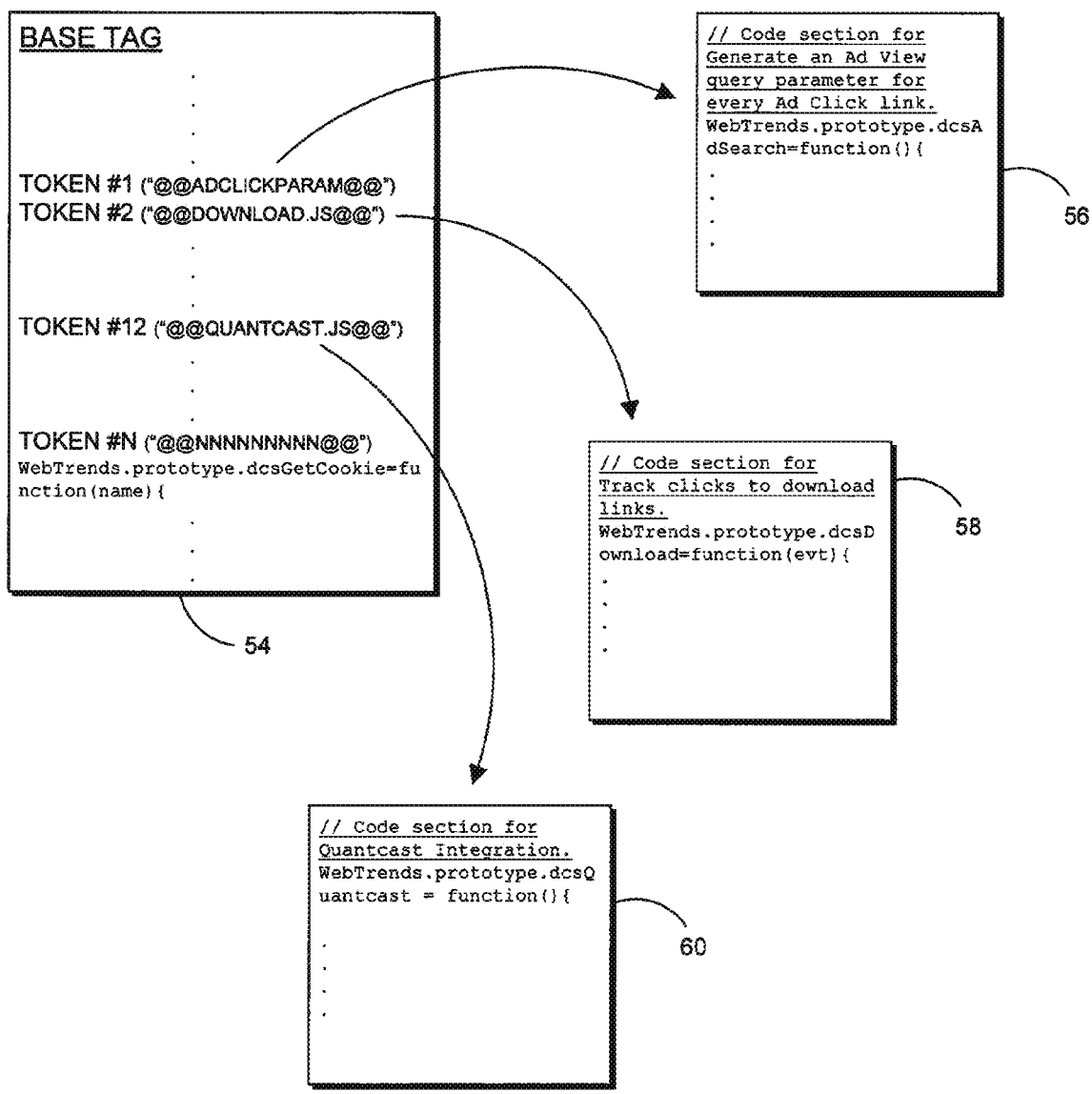
FIG. 4 is a schematic diagram illustrating a construction of a customized analytics application using tokens and associated modules.

FIG. 4 illustrates a schematic diagram of how tokens embedded within the BASE code or tag corresponds with various snippets stored within the module library 40. Token #1 is represented by "@@ADCLICKPARAM@@" and corresponds to a code module 56 that can be substituted in place of the token without interfering with the operation of the remainder of the BASE tag. An embodiment of the ADCLICKPARAM code module is shown in Table 2 above. Similarly, Token #2 is represented by "@@DOWNLOAD.JS@@" and corresponds to a code module 58 that can be substituted in place of the token without interfering with the operation of the remainder of the BASE tag. An embodiment of the DOWNLOAD.JS code module is shown in Table 1 above.

FIG. 4 also illustrates a substitution of JavaScript code string for use in conjunction with Quantcast, a partner service provider. The JavaScript snippet 60 pasted in place of the @@QUANTCAST.JS@@ token is shown in Table 4 below.

TABLE 4

Quantcast.JS Snippet

```
WebTrends.prototype.dcsQuantcast = function( ){
    var i,val,val2;
    var WT=this.WT;
    var dcsEncode=this.dcsEncode;
    var keys=["mc_id","pi","oss"];
    var cg_n=WT.cg_n?WT.cg_n.split(";"):[ ];
    var cg_s=WT.cg_s?WT.cg_s.split(";"):[ ];
    var si_n=WT.si_n?WT.si_n.split(";"):[ ];
    var si_x=WT.si_x?WT.si_x.split(";"):[ ];
    var si_p=WT.si_p?WT.si_p.split(";"):[ ];
    var result="";
    for (i=0;i<keys.length;i++){
        val=WT[keys[i]]||"";
        if (val.length>0){
            result+=(result.length?";":"")+"WT."+keys[i]+"."+dcsEncode(val);
        }
    }
    for (i=0;i<cg_n.length;i++){
        result+=(result.length?";":"")+"WT.cg."+dcsEncode(cg_n[i]);
        val=cg_s[i]||"";
        if (val.length>0){
            result+="."+dcsEncode(val);
        }
    }
    for (i=0;i<si_n.length;i++){
        result+=(result.length?";":"")+"WT.si."+dcsEncode(si_n[i]);
        val=si_x[i]||"";
        val2=si_p[i]||"";
        if (val.length>0){
            result+="."+dcsEncode(val);
        }
        else if (val2.length>0){
            result+="."+dcsEncode(val2);
        }
    }
    return result;
}
```

Additionally, an HTML code string is substituted into the base HTML code that references a JavaScript external include file hosted by Quantcast. An example of the HTML snippet is shown below in Table 5 as an example of a bifurcated presentation of data mining code to the visitor computer.

TABLE 5

Quantcast HTML Snippet

```
<!-- Start Quantcast tag -->
<script type="text/javascript">
//<![CDATA[
var _qoptions=
{qacct:"@@CUSTID@@",labels:_tag.dcsQuantcast( )};
```

TABLE 5-continued

Quantcast HTML Snippet

```
//]]>>
</script>
<script type="text/javascript"
src="//secure.quantserve.com/quant.js"></script>
<noscript>
<a href="http://www.quantcast.com/@@CUSTID@@"
target="_blank"><img
src="//secure.quantserve.com/pixel/@@CUSTID@@.gif"
style="display: none;"
border="0" height="1" width="1" alt="Quantcast"/></a>
</noscript>
<!-- End Quantcast tag -->
```

Operation of the Quantcast snippet within a web site visitor's browser causes the collection of specified partner-desired data, the arranging of the partner-desired data within a specified format, and the reporting of this partner-desired data to the partner (e.g. Quantcast) server 19 [FIG. 1]. In this way, a tag may be generated at a single location that services the needs of many different entities such as the original service provider and any partner providers.

Having described and illustrated the principles of the invention in a preferred embodiment thereof it should be apparent that the invention can be modified in arrangement and detail without departing from such principles. We claim all modifications and variation coming within the spirit and scope of the following claims.

The invention claimed is:

1. A method for constructing web analytics code for use with a web page on a browser of a visiting computer, the method comprising the steps of:
   using a browser, navigating to a web-based tag builder application;
   creating a web customized analytics tag using the web-based tag builder application, by performing the steps of:
      retrieving a base analytics code including a base data mining code wherein the base data mining code includes a plurality of tokens corresponding to unincorporated code snippets, each unincorporated code snippet is configured to track a different custom web analytic;
      displaying for selection at least one web analytic to track;
      receiving user selection of at least one displayed web analytic to track over a wide area network;
      in response to the user selection, determining the corresponding token associated with the selected web analytic and retrieving the unincorporated code snippet corresponding to the each selected displayed web analytic from a library of such code snippets to incorporate into the base analytic code;
      substituting each retrieved unincorporated code snippet in place of its corresponding token within the base analytics code to create the web customized analytics tag; and
      finalizing the web customized analytics tag by removing the remaining tokens; and
   delivering the web customized analytics tag to the user for incorporation into the web page for tracking.

2. The method of claim 1, wherein the step of finalizing the web customized analytics tag includes:
   creating a single JavaScript file [Wong, Abstract] configured for direct incorporation into a web page to be tracked; and
   delivering said single JavaScript file to said user over the wide area network.

3. The method of claim 1, wherein the step of finalizing the web customized analytics tag includes:
   creating a JavaScript file configured with each retrieved code snippet for storage on a JavaScript file server coupled over the wide area network;
   creating an external include linked to the JavaScript file and configured for direct incorporation into a web page stored at a first server; and
   delivering the JavaScript file and the external include to said user over the wide area network.

4. The method of claim 3, wherein the account server and the first server are the same.

5. The method of claim 1, further comprising:
   receiving a second selection from a user of a second displayed web analytic to track over a wide area network;
   retrieving the unincorporated code snippet corresponding to the second displayed web analytic from a library of such code snippets;
   substituting the unincorporated code snippet corresponding to the second displayed web analytic in place of its corresponding token within the web customized analytics code.

6. A method for constructing web analytics code for use with a web page on a browser of a visiting computer, the method comprising the steps of:
   storing a plurality of code snippets in a library, each of the code snippets associated with at least one of a plurality of available analytics tracking options, the library further storing a base analytic code including a base data mining code wherein the base data mining code includes a plurality of token placeholders corresponding to the plurality of code snippets using a web-based tag builder application;
   receiving user selection of at least one of the code snippets over a network via a browser and input indicating a desired configuration for the available analytics tracking options associated with the selected code snippets and retrieving the selected code snippets;
   integrating the retrieved code snippets into a web customized analytics tag by substituting the selected code snippets in place of their corresponding token placeholders and removing the remaining token placeholders, the web customized analytics tag comprising (i) the base analytics code configured to track base analytics information, and (ii) a customized component including the selected code snippet integrated with the base analytics code into one or more files; and
   delivering the web customized analytics tag to the user for incorporation into the web page for tracking.

7. The method of claim 6, wherein the integrating step includes integrating the retrieved code snippet into a single monolithic tag with the base analytics code, said monolithic file being configured to be attached to html of a web page to be tracked.

8. The method of claim 6, wherein the integrating step includes integrating the retrieved code snippet into a first file and a second file, the first file including a call to the second file, and the second file being configured to retrieve analytics information from a visitor computer to the web page being tracked.

9. A system for configuring a customized analytics tags for use with a web page, comprising:

a display device, for displaying within a web browser a selection of at least one of a plurality of available analytics tracking options using a web-based tag builder application;

an input device, for receiving user selection of at least one of the available analytics tracking options and for receiving input indicating a desired configuration for the selected available analytics tracking options;

a module library for storing a plurality of code snippets, each of the code snippets associated with at least one of the plurality of available analytics tracking options, the module library further storing a base analytic code including a base data mining code wherein the base data mining code includes a plurality of token placeholders corresponding to the plurality of code snippets;

an integration module, for determining a corresponding one of the plurality of token placeholders associated with a corresponding one of the plurality of code snippets and incorporating the selected available analytics tracking options into the base analytic code in place of the corresponding token placeholders to form a web customized analytics tag and finalizing the customized analytics tag by removing the remaining token placeholders; and a delivery module, for delivering the web customized analytics tag to the user for incorporation into the web page for tracking.

10. The system of claim 9, wherein the selection of at least one available analytics tracking option includes an event tracking option.

11. The system of claim 10, wherein the event tracking option includes at least one selected from the group consisting of off-site links, download links, anchor links, form buttons, mailto: links, JavaScript links, image maps, transition page tracking, and ad impressions.

12. The system of claim 11, the input device further configured for receiving a parameter for tracking of ad impressions from an inline page ad URL.

13. The system of claim 9, wherein the selection of at least one available analytics tracking option includes a visitor tracking option.

14. The system of claim 13, wherein the visitor tracking option includes at least one selected from the group consisting of tracking visitors to subdomains separately from a primary domain, designating a cookie name, enabling session-only tracking, and setting a query parameter visitor ID.

15. The system of claim 9, wherein the selection of at least one available analytics tracking option includes data mapping.

16. The system of claim 15, wherein the data mapping option includes designating meta tags for capture, assigning custom query parameters, and setting query parameters using a designated cookie.

17. The system of claim 9, wherein the selection of at least one available tracking option includes domain filtering including designating a domain or subdomain for which data is to be diverted.

18. The system of claim 9, wherein the selection of at least one available tracking option includes tag integration, wherein the module library includes a code snippet configured to compile and report visitor data in a form received by a partner server.

* * * * *